US011512672B2

(12) United States Patent
Bauvir et al.

(10) Patent No.: US 11,512,672 B2
(45) Date of Patent: Nov. 29, 2022

(54) INTERNAL COMBUSTION ENGINE SYSTEM OPERABLE IN AT LEAST TWO OPERATING MODES

(71) Applicant: VOLVO TRUCK CORPORATION, Gothenburg (SE)

(72) Inventors: Laurent Bauvir, Lyons (FR); Raphael Bost, Vaulx en Velin (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/659,090

(22) Filed: Apr. 13, 2022

(65) Prior Publication Data
US 2022/0341379 A1 Oct. 27, 2022

(30) Foreign Application Priority Data
Apr. 22, 2021 (EP) .................... 21169790

(51) Int. Cl.
*F02M 26/05* (2016.01)
*F02D 41/00* (2006.01)
(Continued)

(52) U.S. Cl.
CPC ......... *F02M 26/05* (2016.02); *F02D 41/0007* (2013.01); *F02D 41/0065* (2013.01);
(Continued)

(58) Field of Classification Search
CPC ........ F02M 26/43; F02M 26/06; F02M 26/21; F02M 26/19; F02M 26/39; F02M 35/108;
(Continued)

(56) References Cited

U.S. PATENT DOCUMENTS 4,303,053 A 12/1981 Etoh et al.
6,023,929 A 2/2000 Ma
(Continued)

FOREIGN PATENT DOCUMENTS

EP 2267291 A2 12/2010
WO WO-2021078379 A1 * 4/2021 ........... F01N 13/107

OTHER PUBLICATIONS

European Search Report dated Oct. 11, 2021 in corresponding European Patent Application No. 21169790.9, 8 pages.

*Primary Examiner* — Ngoc T Nguyen
(74) *Attorney, Agent, or Firm* — Venable LLP; Jeffri A. Kaminski

(57) ABSTRACT

The invention relates to an internal combustion engine system. The system includes a mixing unit comprising a four-way valve. The four-way valve having a first inlet connected to the EGR line, a second inlet connected to the air inlet line, a first outlet connected to the first intake manifold and a second outlet connected to the second intake manifold. The four-way valve is designed so that, in said normal operating mode, the intake gases supplied to the first intake manifold and to the second intake manifold have approximately the same proportion of exhaust gas and fresh air and so that, in said cylinder deactivation mode, the intake gas supplied to the first intake manifold only includes exhaust gas and the fresh air is directed exclusively to the second intake manifold.

15 Claims, 5 Drawing Sheets

(51) Int. Cl.
  *F02M 26/21* (2016.01)
  *F02M 26/43* (2016.01)
  *F02M 26/23* (2016.01)
(52) U.S. Cl.
  CPC ...... *F02D 41/0082* (2013.01); *F02D 41/0087* (2013.01); *F02M 26/21* (2016.02); *F02M 26/23* (2016.02); *F02M 26/43* (2016.02)
(58) Field of Classification Search
  CPC ............ F02D 41/0082; F02D 41/0087; F02D 41/0065
  See application file for complete search history.

(56) References Cited

U.S. PATENT DOCUMENTS

| | | | |
|---|---|---|---|
| 2016/0252055 A1* | 9/2016 | Nair | F02M 26/35 123/568.12 |
| 2016/0298557 A1 | 10/2016 | Bjurman | |
| 2017/0260916 A1 | 9/2017 | Kraemer et al. | |

* cited by examiner

INTERNAL COMBUSTION ENGINE SYSTEM OPERABLE IN AT LEAST TWO OPERATING MODES

TECHNICAL FIELD

The invention relates to an internal combustion engine operable in at least two operating modes, respectively a normal operating mode and a cylinder deactivation mode.

The invention can be applied in heavy-duty vehicles, such as trucks, buses and construction equipment. Although the invention will be described with respect to a truck, the invention is not restricted to this particular vehicle, but may also be used in other vehicles such as buses, construction equipment and passenger cars. The invention may also be used on other transportation means such as ships and boats or on any type of industrial application using a combustion engine (gensets, machines, agricultural equipment).

BACKGROUND

For a vehicle internal combustion engine, such as a diesel type engine for a heavy-duty vehicle, an exhaust after treatment system (EATS) is usually provided to reduce emissions, e.g. of nitrogen oxides (NOx). Such a system, which may include units such as a selective catalytic reduction (SCR) converter, requires exhaust gas temperatures that are relatively high in order to provide an efficient emission reduction.

However, measures to reduce fuel consumption may reduce the heat loss from the engine to the EATS. Therefore, particularly at low load operation, cold ambient temperatures, and/or cold start events, the EATS might not get enough heat to operate efficiently. In particular, the SCR catalyst is usually more effective when the temperature of the exhaust gas is high. Accordingly, increasing the exhaust gas temperature helps increasing NOx reduction and reducing NOx emissions.

To increase the temperature of the exhaust gases of an engine, a known solution consists to deactivate some of the engine cylinders, i.e. to shut off the fuel supply and air intake in some of the engine cylinders. As a result, cylinders that have been deactivated no longer draw fresh air, the volume of air drawn in by the engine block (acting as a volumetric pump) is lower. A side effect might be that the turbocharger loses efficiency: Therefore, the mass airflow rate supplied to each active cylinder can be reduced in comparison with the normal operating mode. In parallel, the total fuel flow injected into the engine cylinders remains the same to ensure that the engine delivers the same power. As some cylinders have been deactivated and therefore no longer receive fuel, the fuel flow injected into the remaining cylinders, i.e. the active cylinders, is mathematically higher. Under these conditions, the Air-Fuel Ratio (AFR) inside the active cylinders is lower and the exhaust gas temperature increases.

Increasing the temperature of the exhaust gases may have several benefits, among which are:
The cleaning of the Diesel Particulate Filter (DPF);
NOx emissions reduction;
In addition to increasing the exhaust gas temperature, cylinder deactivation can have other advantageous consequences such as:
Fuel savings (in particular in the case of a Gasoline engine).
Such a solution has been disclosed in U.S. Pat. No. 4,303,053 and US 2016/0298557.

However, the solution proposed in this prior art leads to add much complexity in the structure of the engine and decrease the free space around the engine, which is a major drawback during the mounting or maintenance processes of the vehicle. In particular, US2017/0260916 makes use of two turbochargers, a dedicated valve to isolated two halves of a manifold and two other valves to isolate the corresponding turbocharger. This adds much complexity to the system which is a major constraint for the application.

SUMMARY

An object of the invention is to provide an internal combustion engine system operable in at least two operating modes, respectively a normal operating mode and a cylinder deactivation mode, in which some of the engine cylinders are deactivated, and in which the drawbacks of the known solutions are avoided.

The object is achieved by a system according to claim 1. Thus, the object is achieved by an internal combustion engine system Internal combustion engine system, comprising:
an internal combustion engine comprising a cylinder block housing a plurality of cylinders, a first intake manifold connected to a first group of cylinders, a second distinct intake manifold connected to a second group of cylinders and an exhaust manifold for receiving the exhaust gas emitted from at least the first group of cylinders;
an air inlet line;
an EGR line connected to the exhaust manifold;
wherein the internal combustion engine system is operable in at least two operating modes, respectively a normal operating mode in which all cylinders are supplied with fuel and a cylinder deactivation mode, in which the cylinders of the first group of cylinders are no longer supplied with fuel nor fresh air, characterized in that:
the system also includes a mixing unit comprising a four-way valve, said four-way valve having a first inlet connected to the EGR line, a second inlet connected to the air inlet line, a first outlet connected to the first intake manifold and a second outlet connected to the second intake manifold;
the four-way valve is designed so that, in said normal operating mode, the intake gases supplied to the first intake manifold and to the second intake manifold have approximately the same proportion of exhaust gas and fresh air and so that, in said cylinder deactivation mode, the intake gas supplied to the first intake manifold only includes exhaust gas and the fresh air is directed exclusively to the second intake manifold.

By "approximately the same proportion of exhaust gas", it is meant that the amplitude, i.e. the difference between the smallest exhaust gas proportion value and the largest exhaust gas proportion value, is less than 5%, preferably less than 2%. This means that the invention encompasses the case in which there is a proportion of exhaust gas of 20% in one intake manifold and of 25% in the other intake manifold (respectively of 18% and 22% when the amplitude is set to 2%).

By "approximately the same proportion of fresh air", it is meant that the amplitude, i.e. the difference between the smallest fresh air proportion value and the largest fresh air proportion value, is less than 5%, preferably less than 2%. This means that the invention encompasses the case in which there is a proportion of fresh air of 80% in one intake manifold and of 75% in the other intake manifold (respectively of 82% and 78% when the amplitude is set to 2%).

Thus configured, the system of the present invention permits to control the flow of fresh air and exhaust gas supplied to the engine cylinders by the use of a mixing unit upstream of the intake manifolds of the engine. This mixing unit thus allows the supply of fresh air inside deactivated engine cylinders to be cut off during a cylinder deactivation mode while maintaining a supply of a mix of fresh air and exhaust gas inside all engine cylinders during a normal operating mode. This mixing unit has the advantage relative to the prior art solutions to maintain a relatively simple structure for the engine and to have a lower impact on the dimensions of the whole system. The second advantage relative to the prior art solutions is that it ensures a delivery of recirculated exhaust gases in a closed-loop inside the deactivated cylinders, to minimize their pumping losses. Minimizing these losses is a key to reduce fuel consumption.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
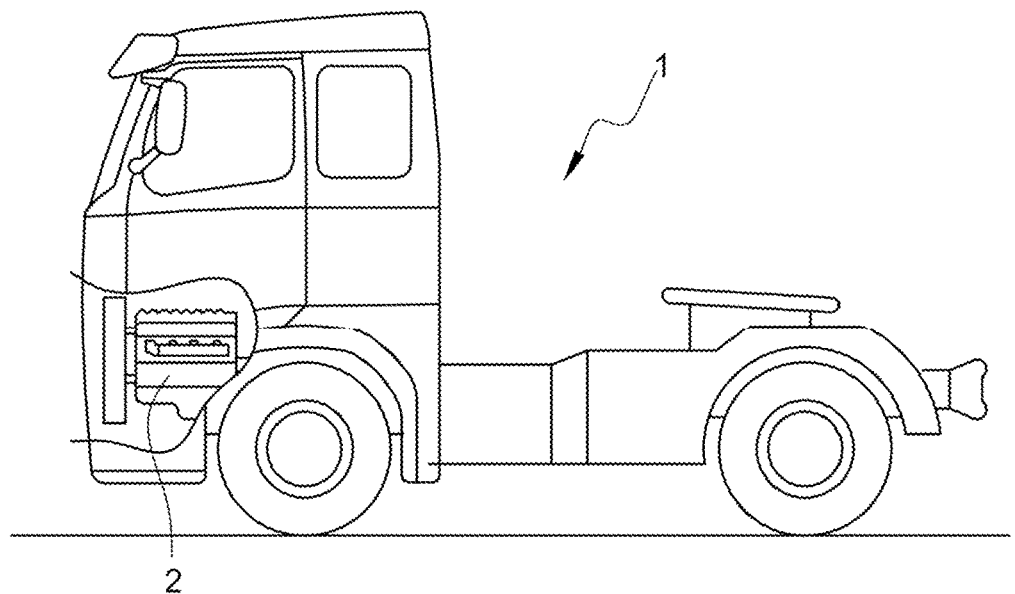
FIG. 1 is a side view of a truck comprising an internal combustion engine.

FIG. 1 shows a vehicle 1 in the form of a truck in a partly cut side view. The vehicle 1 has an internal combustion engine 2 for the propulsion of the vehicle.

Figure 2A:
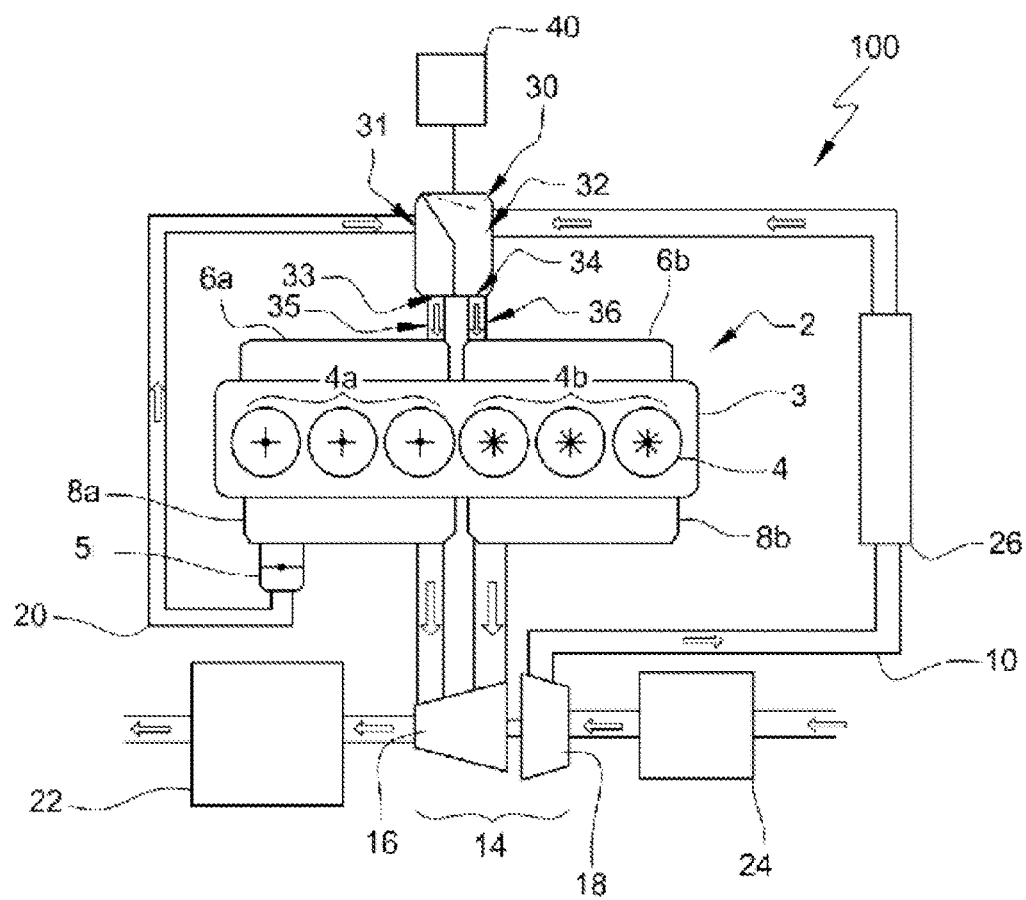
FIG. 2a is a schematic view of an internal combustion engine system according to the invention, belonging to the vehicle of FIG. 1.

In reference to FIG. 2a, an internal combustion engine system 100 is shown which is used in the vehicle of FIG. 1 or in any other vehicle or machine comprising an internal combustion engine. The system 100 comprises an internal combustion engine 2 with a cylinder block 3 having a plurality of cylinders 4, e.g. six cylinders in an inline configuration. The cylinders 4 are divided into a first group of cylinders 4a and a second group of cylinders 4b. In the example shown, there are three cylinders 4 in the first group of cylinders 4a and three cylinders 4 in the second group of cylinders 4b. It should be noted that the invention is equally applicable to engines with a different number of cylinder, e.g. two, three, seven, etc. Also, the number of cylinders in the first and second groups of cylinders 4a, 4b may be mutually different. In addition, the cylinder may have a configuration which different from an inline configuration, e.g. a V- configuration.

The internal combustion engine is preferably a Diesel engine. However, it can also be a Gasoline engine or an engine working with any other fuel, such as an ethanol-fueled engine.

Furthermore, the internal combustion engine 2 has a first intake manifold 6a for providing gas to the first group of cylinders 4a and a second intake manifold 6b for providing gas to the second group of cylinders 4b. The internal combustion engine 2 has also a first exhaust manifold 8a for receiving the exhaust gas emitted from the first group of cylinders 4a and a second exhaust manifold 8b for receiving the exhaust gas emitted from the second group of cylinders 4b. In an alternative embodiment (not shown), the first and second intake manifolds 6a, 6b, respectively the first and second exhaust manifolds 8a, 8b, may be embedded in a single component figuring separate flow paths.

A part of the exhaust gas emitted by the first group of cylinders 4a and all exhaust gas emitted by the second group of cylinders 4b are led to a turbocharger 14 comprising a turbine 16 and an air compressor 18 and onward to an exhaust gas aftertreatment system 22. This turbocharger can be of a fixed geometry or variable geometry type. It may also include an electrical assistance via an electric machine mounted on the shaft making. The system may also include other air-charging devices like supercharger or other turbochargers arranged in parallel or in series arrangement. The turbocharger 14 can be used for the compression of the fresh air that is supplied to the first and second intake manifolds 6a, 6b through an air inlet line 10 and via a mixing unit 30 which will be detailed in the following paragraphs. The fresh air may be filtered in an air filter 24 before its compression, and may be cooled in a charged air cooler 26 after its compression.

The exhaust gas aftertreatment system 22 usually comprises a plurality of exhaust gas aftertreatment units, such as e.g. a diesel oxidation catalyst, a particulate filter and a selective catalytic reactor (SCR).

A SCR unit is a means for converting nitrogen oxides by means of a catalyst into nitrogen and water. An optimal temperature range for these reactions is typically between approximately 250° Celsius and approximately 450° Celsius. This optimal operating temperature can be easily kept during normal (driving) operation modes of the engine.

However, during idle or motoring engine operation modes of the internal combustion engine 2, the temperature of the exhaust gas drops. The reason for that is that fresh air at ambient temperature is fed to the intake manifolds 6a, 6b, even if combustion is reduced considerably (as in the idle engine operation mode) or no combustion takes place at all (as in the motoring engine operation mode). This in turn means that the internal combustion engine 2 is simply pumping fresh and cool air to the exhaust manifolds 8a, 8b and onward into the exhaust gas aftertreatment system 22. This cool air causes the exhaust gas aftertreatment system 22 to cool down rapidly below its optimal operating temperature, which in turn results in poor or no exhaust gas purification, so that the required NOx emission levels cannot be achieved.

For increasing the temperature of the exhaust gas streaming through the exhaust gas aftertreatment system 22, it is proposed in the present invention to operate the system 100 in a Cylinder Deactivation mode (known as "CDA mode" or "NOx reduction mode" in the literature) during which the cylinders 4 of the first group of cylinders 4a are controlled to be inactive, that means no fuel is injected into the cylinders 4 of the first group of cylinders 4a, and during which the cylinders 4 of the second group of cylinders 4b in contrast are controlled to be active. That means the load required for operating the engine in the cylinder deactivation mode is only provided by the second group of cylinders 4b. As mentioned in the introduction above, to succeed in increasing the exhaust gas temperature implies that the cylinders 4a that have been deactivated no longer draw fresh air: the volume of air drawn in by the engine block (acting as a volumetric pump) is thus lower. A side effect might be that the turbocharger 14 losses efficiency: Therefore, the mass airflow rate supplied to each active cylinder can be reduced in comparison with the normal operating mode. In parallel, the fuel flow injected into the engine cylinders remains the same to ensure that the engine delivers the same power. As some cylinders 4a have been deactivated and therefore no longer receive fuel, the fuel flow injected into the remaining cylinders, i.e. the active cylinders 4b, is mathematically higher. Under these conditions, the Air-Fuel Ratio (AFR) inside the active cylinders 4b is lower and the exhaust gas temperature increases.

In practice, the temperature of the exhaust gas can be increased up to 250° C., preferably up to 300° C., during the cylinder deactivation mode.

It can be added that, even if the mass air flow introduced into the active cylinders 4b is reduced, it remains sufficiently large to ensure complete combustion of the fuel, so that all the fuel introduced into the combustion cylinders 4b is burned and there is no fuel in the exhaust gases. Cylinder deactivation mode then differs from a standard regeneration operating mode in which a small quantity of fuel is directly injected into the flow of exhaust gas to increase its temperature via the Diesel Oxydation Catalyst. Moreover, using this method of injecting fuel in the exhaust gases to provoke an oxidation on the catalyst already relies on their temperature to be sufficient. Therefore the cylinder deactivation mode can also be a facilitator for this regeneration requirement. Cylinder deactivation mode also differs from other exhaust temperature heating means consisting in increasing heat losses and which are thus less fuel efficient.

Furthermore, the system 100 comprises an EGR line 20 which is branched off at the first exhaust manifold 8a, said EGR line 20 being fluidly connected to the mixing unit 30. The EGR line 20 is thus adapted to supply the mixing unit 30 with recirculated exhaust gas generated by the internal combustion engine 2. The EGR line 20 may or may not be equipped with an EGR Cooler dedicated to the cooling of the recirculated exhaust gases. Also optional, is the existence of any device dedicated to control or enhance the EGR drive along the EGR line 20 like an EGR pump or check valves. An EGR valve 5 arranged downstream to the first exhaust manifold 8a may advantageously be provided for regulating the amount of recirculated exhaust gas that is supplied to the EGR line 20.

The same EGR line 20 and EGR Valve 5 are also used to serve the purpose of limiting the pumping losses of the engine in the Deactivation Mode. More specifically, by opening widely the EGR Valve 5, the first intake manifold 6a is fluidically connected as permeably as possible to the first exhaust manifold 8a. The cylinders 4a are thus let free to pump their own exhaust gases in a closed loop without resistance via the mixing unit 30.

The mixing unit 30 comprises a first inlet 31 fluidly connected to the EGR line 20, a second inlet 32 fluidly connected to the air inlet line 10, a first outlet 33 fluidly connected to the first intake manifold 6a via a first pipe 35 and a second outlet 34 fluidly connected to the second intake manifold 6b via a second pipe 36. The mixing unit 30 is adapted to control the flow of fresh air and exhaust gas supplied to the first and second intake manifolds 6a, 6b by the air inlet and EGR lines 10, 20. In particular, in the cylinder deactivation mode of the system 100, the mixing unit 30 is adapted to prevent a flow of fresh air to the first intake manifold 6a and a flow of exhaust gas to the second intake manifold 6b while allowing a flow of exhaust gas to the first intake manifold 6a and a flow of fresh air to the second intake manifold 6b. This corresponds to a closed configuration of the mixing unit 30. Consequently, when the mixing unit 30 is put in this closed configuration, the absence of a fresh air flow to the first group of cylinders 4a means that no fuel will be supplied to these cylinders 4a. In the meanwhile, to ensure the engine power remains constant, the quantity of fuel supplied to the second group of cylinders 4b will be increased correspondingly. On the contrary, in the normal operating mode of the system 100, the mixing unit 30 is adapted to allow a flow of a mix of fresh air and exhaust gas to both the first and second intake manifolds 6a, 6b. This corresponds to a fully opened configuration of the mixing unit 30. In that fully opened configuration, the mixing unit 30 is designed so that the intake gases supplied to the first intake manifold 6a and to the second intake manifold 6b have approximately the same proportion of exhaust gas and fresh air. Furthermore, in a partially opened configuration of the mixing unit 30, the mixing unit 30 may be designed to control an asymmetric proportion of air and exhaust gas in each intake manifold 6a and 6b. This corresponds to a partially deactivated mode of the system 100.

The system 100 may advantageously comprise a controller 40 for switching from the normal operating mode to the cylinder deactivation mode and vice versa. The system 100 may advantageously be progressively switched between these two operating modes by operating in the partially deactivated mode. This switch may be based on engine state input, like speed and load, or EATS state input, like inlet or bricks temperatures. These inputs may be based on signals received from physical or virtual sensors. The decision strategy may also be linked with advanced function at a vehicle or mission level like state prediction functions. The controller 40 may also be adapted to control the opening, the closing and/or the partial opening of the mixing unit 30 depending on the operating mode of the system 100.

Different examples are disclosed below to improve understanding of the invention.

In one exemplary operating mode of the engine system, the mixing unit 30 has been controlled by the controller 40 to be in a partially opened configuration, so that the first intake manifold 6a have a proportion of 90% of exhaust gas and 10% fresh air and the second intake manifold 6b have a proportion of 90% of fresh air and 10% exhaust gas: the system 100 is in a partially deactivated mode. The controller 40 may thus control the injection of fuel so that a portion of the total fuel flow injected in the system 100 is supplied to the first group of cylinders 4a, following the portion of total air entering these cylinders 4a. By a portion, it is meant that the quantity of fuel entering the cylinders 4a should be linked to the amount of air entering these cylinders 4a but not necessarily proportionally. For example, with 10% (resp.

20%) of the air flow delivery coming from the second inlet 32 to the first group of cylinders 4a, 4% (resp. 13%) of the total fuel injected in the system 100 is supplied to the cylinders 4a. This makes the system work in a transition mode between the normal operating mode and the cylinder deactivation mode.

By working in such a partially deactivated mode, two major advantages can be obtained in the operation of the engine system.

Firstly, the engine system can maintain the majority of the benefits of a reduced fresh air flow and increased exhaust temperature, as above described for the cylinder deactivation mode, while extending its operating envelope in a continuously variable way towards increased torque. This increased torque is provided partly by the combustion being operated in the first group of cylinders 4a that are fed with a controlled fresh air flow. This results in smooth transition between the normal operating mode and the cylinder deactivation mode.

Secondly, it enables that the second group of cylinders 6b is working with a portion of exhaust gases coming from the exhaust manifold 8a of the first group of cylinders 4a. Since the partial delivery of fresh air flow to the first intake manifold 6a enables to burn a portion of the fuel in the first group of cylinders 4a, the exhaust gases collected in the exhaust manifold 8a will contain a portion of burned gases. This portion of burned gases, products of the combustion mainly $CO_2$ and $H_2O$, will be linked to the portion of fresh air, previous burned gases and fuel entering the cylinders 4a for the combustion process. It is known in the literature that these burned gases, when recirculated in the intake manifolds 6a and 6b will greatly reduce the production of Nitrous Oxyde from the combustion process. With the portion of exhaust gas entering the cylinders 4b, their NOx production will be greatly reduced. Thus, the cylinders 4b being responsible for the vast majority of the combustion and gas exchange process and so of its Nitrous Oxydes emissions, the complete engine emissions will be greatly reduced.

Figure 2B:
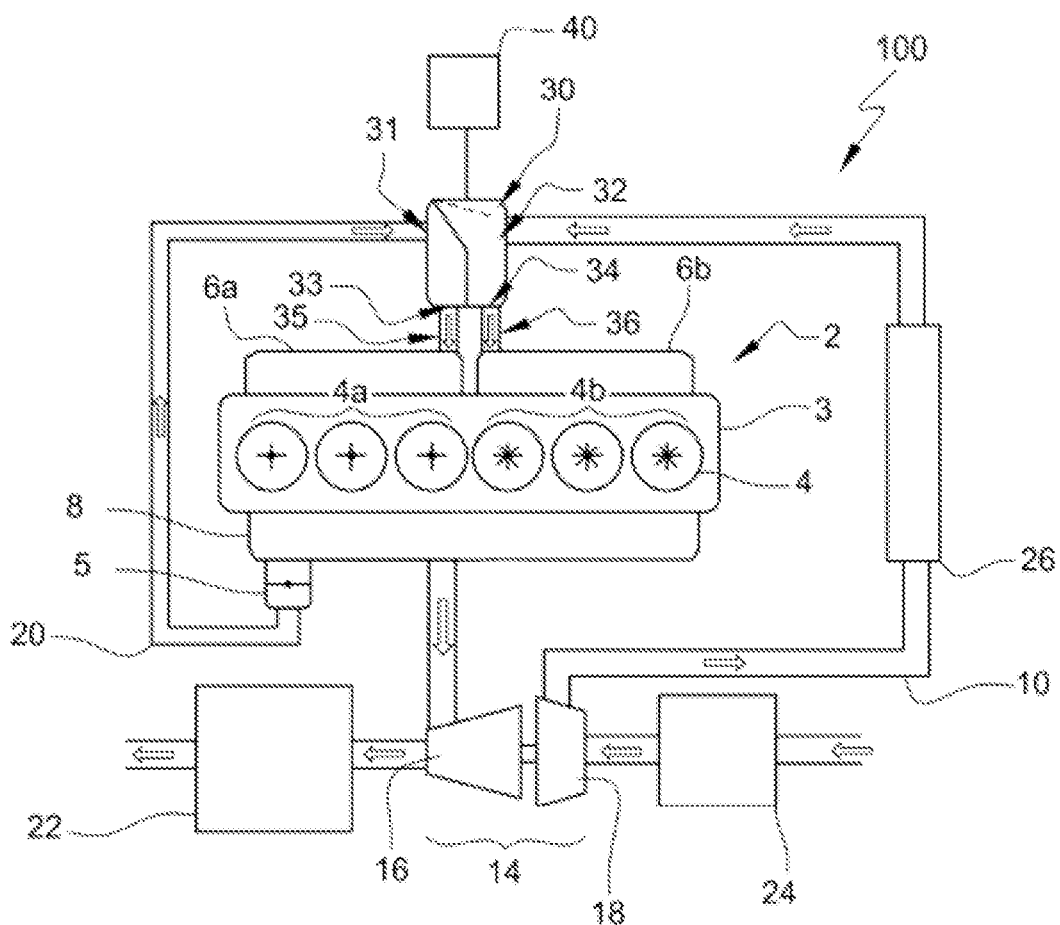
FIG. 2b is a schematic view of an alternate arrangement of the internal combustion engine system according to the invention, belonging to the vehicle of FIG. 1.

In an alternate arrangement of the internal combustion engine system according to the invention, illustrated in FIG. 2b, the system 100 comprises a single exhaust manifold 8, which collects burned gases from both the first and second group of cylinders 4a, 4b. These collected gases may again be advantageously driven by the EGR line 20 to the mixing unit 30 via a single EGR valve 5. In this alternate arrangement, only a part of the exhaust gas emitted by the first and second group of cylinders 4a is led to the turbocharger 14.

Figure 3:
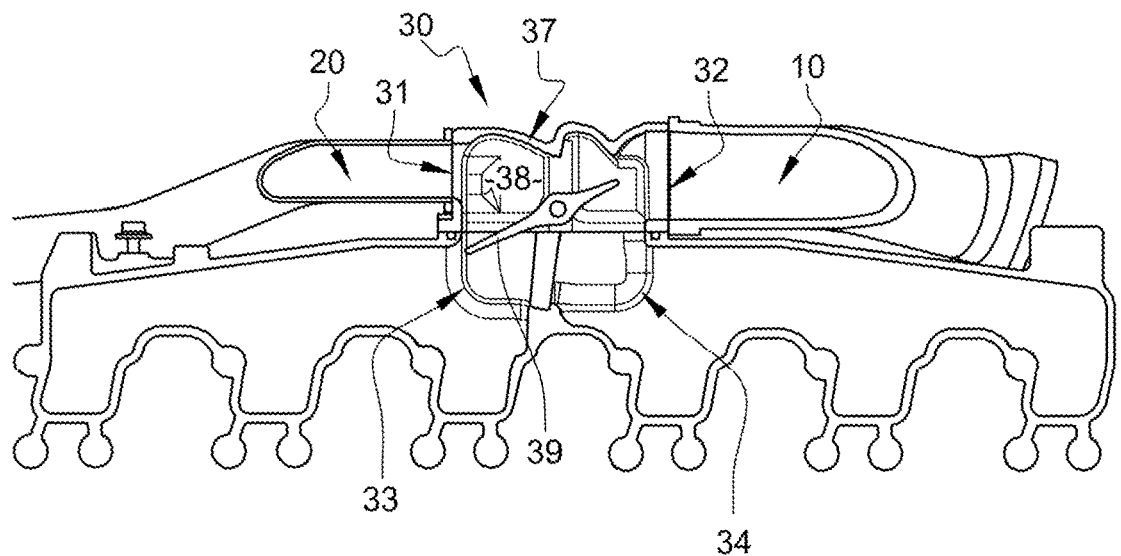
FIG. 3 is a cross-sectional perspective view of the upper portion of the internal combustion engine system shown in FIG. 2 in a first embodiment of the invention.
Figure 4A:
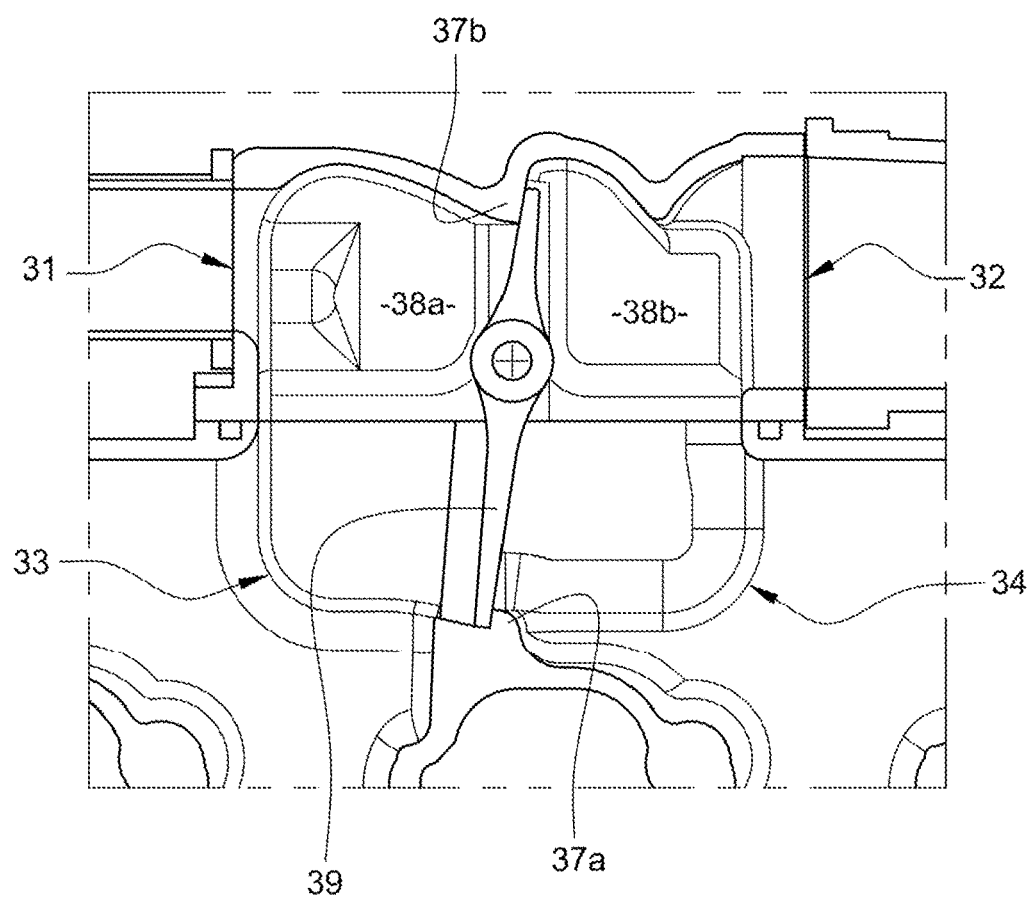
FIG. 4a is an enlarged view of the mixing unit of the internal combustion engine system shown in FIG. 3, the mixing unit being in a closed configuration.

FIG. 3 illustrates the upper portion of the internal combustion engine system 100 shown in FIG. 2a in a first embodiment of the invention. In this embodiment, and as best shown in FIG. 4d, the mixing unit 30 consists in a four-way valve comprising a housing 37 defining an internal chamber 38. The internal chamber 38 having a first portion 38a in fluid communication with the first inlet 31 and the first outlet 33 of the four-way valve 30 and a second portion 38b in fluid communication with the second inlet 32 and the second outlet 34 of the four-way valve 30, the first and second portions 38a, 38b being separated by a central opening 38c. The four-way valve 30 further comprises a flap 39 having a substantially flat shape, and comprising a bottom end 39a and a top end 39b. The flap 39 is pivotally connected to the housing 37 around a pivot axis 39c that is substantially aligned with the central opening 38c. The length of the flap 39 is greater than the width of the central opening 38c. Thus, as illustrated in FIG. 4a, when the bottom and top ends 39a, 39b of the flap 39 are substantially aligned with the central opening 38c, the flap 39 abuts against a bottom abutment surface 37a and a top abutment surface 37b defined by the housing 37 and closes the central opening 38c. In this closed configuration of the valve 30, the fresh air supplied by the air inlet line 10 is guided through the second group of cylinders 4b only. The intake of fresh air for the first group of cylinders 4a is thus controlled to be zero or almost zero. In the same time, the entire flow of exhaust gas supplied by the EGR line 20 is guided through the first group of cylinders 4a only. This closed configuration of the valve 30 will thus lead to an increase of the overall temperature of the whole exhaust gas when the cylinders 4 of the first group of cylinders 4a are controlled to be inactive and the cylinders 4 of the second group of cylinders 4b are controlled to be active.

Figure 4B:
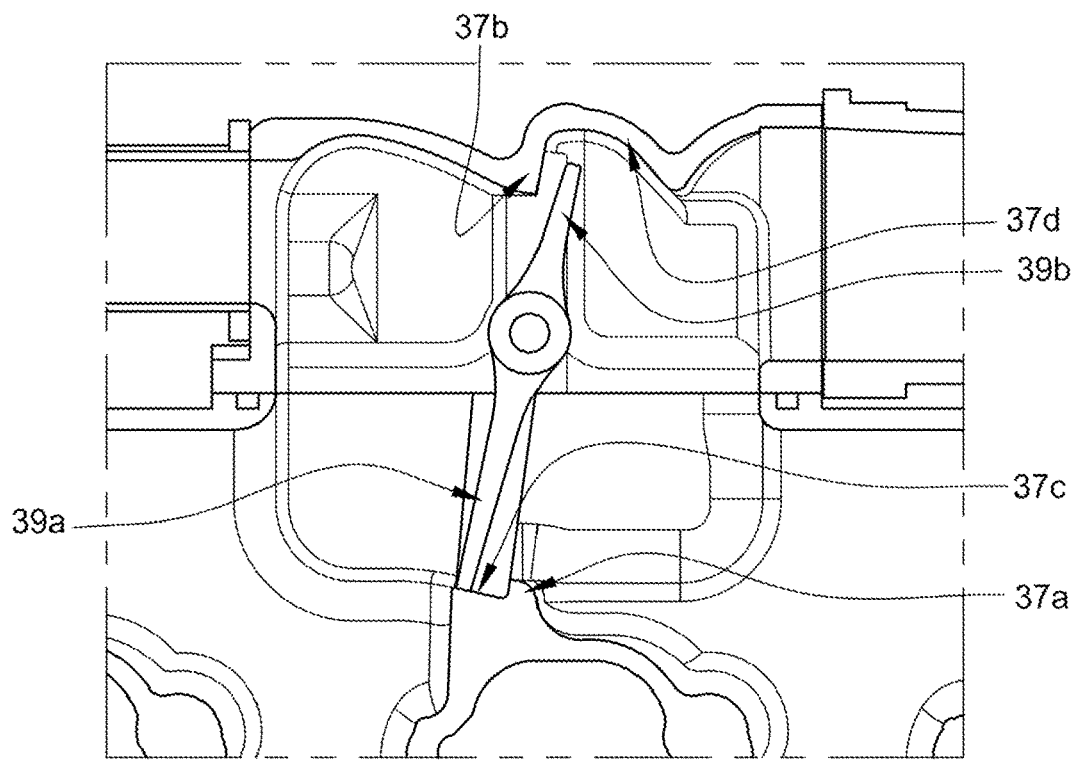
FIG. 4b is a view similar to FIG. 4a, the mixing unit being in a first partially opened configuration.
Figure 4C:
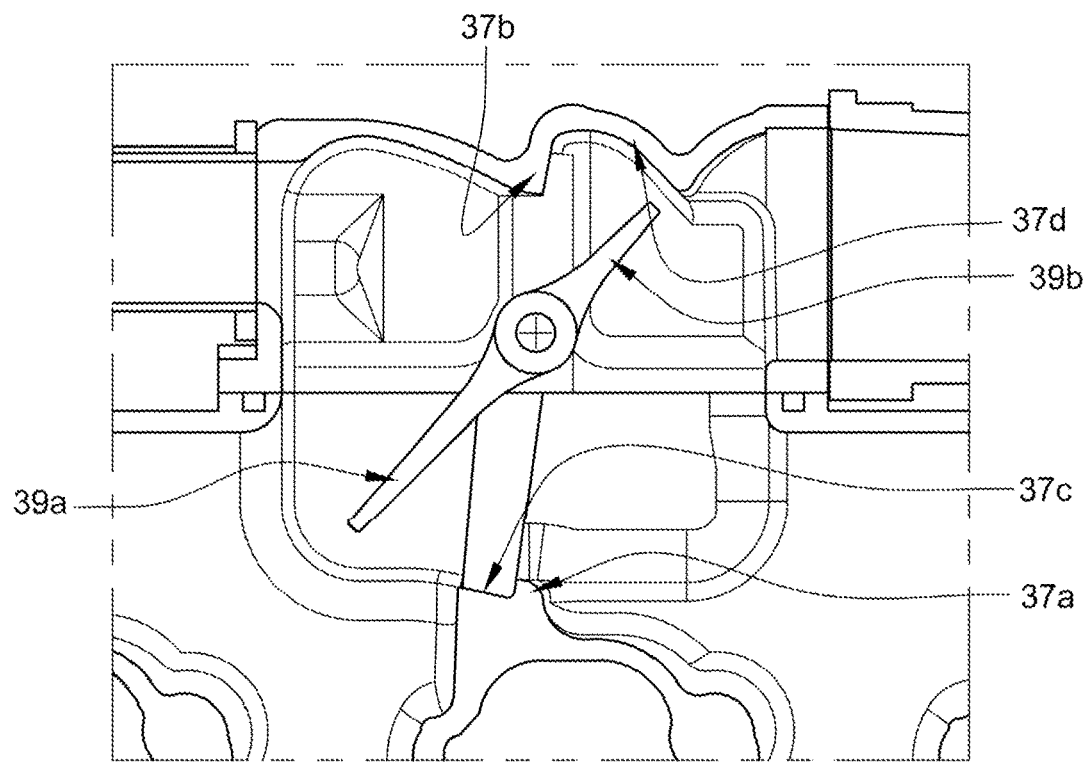
FIG. 4c is a view similar to FIG. 4a, the mixing unit being in a second partially opened configuration.
Figure 4D:
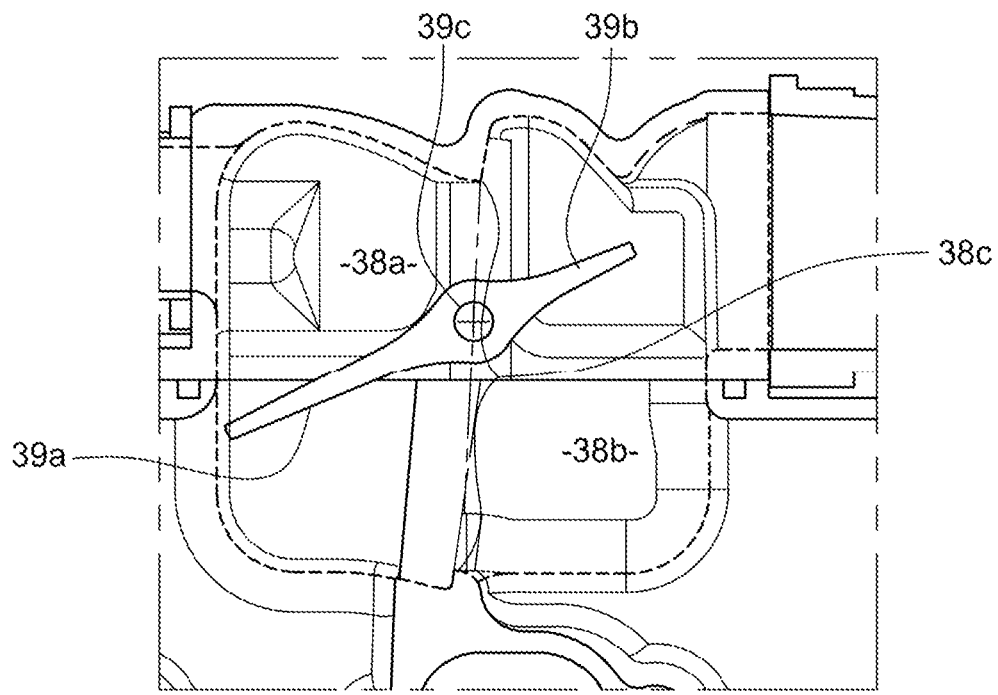
FIG. 4d is a view similar to FIG. 4a, the mixing unit being in a full opened configuration.

In reference to FIG. 4b, it is illustrated a first partially opened configuration of the valve 30, in which the flap 39 is an intermediate position between its position shown in FIG. 4a and its position shown in FIG. 4d. In this position, the bottom and top ends 39a, 39b of the flap 39 are close to the bottom and top abutment surfaces 37a, 37b but without contacting them. Furthermore, the bottom end 39a is sealingly in contact with a bottom internal surface 37c of the housing 37. This bottom internal surface 37c substantially defines an hemi cylindrical part centered on the pivot axis 39c, the distance between said surface 37c and said pivot axis 39c being substantially equal to the length of the bottom end 39a. This sealed contact thus prevents a flow of gas between the first and second portions 38a, 38b in the bottom part of the internal chamber 38. In the same time, the top end 39b is sufficiently distant from a top internal surface 37d to allow a flow of gas between the first and second portions 38a, 38b in a top part of the internal chamber 38. This first partially opened configuration of the valve 30 will thus lead to guide a small flow of exhaust gas through the second group of cylinders 4b, while preventing a flow of fresh air through the first group of cylinders 4a.

In reference to FIG. 4c, it is illustrated a second partially opened configuration of the valve 30, in which the flap 39 is an intermediate position between its position shown in FIG. 4b and its position shown in FIG. 4d. In this position, the bottom and top ends 39a, 39b of the flap 39 are sufficiently distant from the bottom and top abutment surfaces 37a, 37b and from the bottom and top internal surfaces 37c, 37d to allow a small flow of gas between the first and second portions 38a, 38b in both bottom and top parts of the internal chamber 38. This second partially opened configuration of the valve 30 will thus lead to guide a small flow of exhaust gas through the second group of cylinders 4b, while also allowing a small flow of fresh air through the first group of cylinders 4a.

In reference to FIG. 4d, it is illustrated the fully opened configuration of the valve 30. In this configuration, the bottom and top ends 39a, 39b of the flap 39 are sufficiently distant from the bottom and top abutment surfaces 37a, 37b and from the bottom and top internal surfaces 37c, 37d to allow a non-restricted flow of gas between the first and second portions 38a, 38b in both bottom and top parts of the internal chamber 38. This configuration of the valve 30 corresponds to the normal operating mode of the system 100 in which a mix of exhaust gas and fresh air is supplied to the cylinders 4 of the first and second groups of cylinders 4a, 4b.

Figure 5:
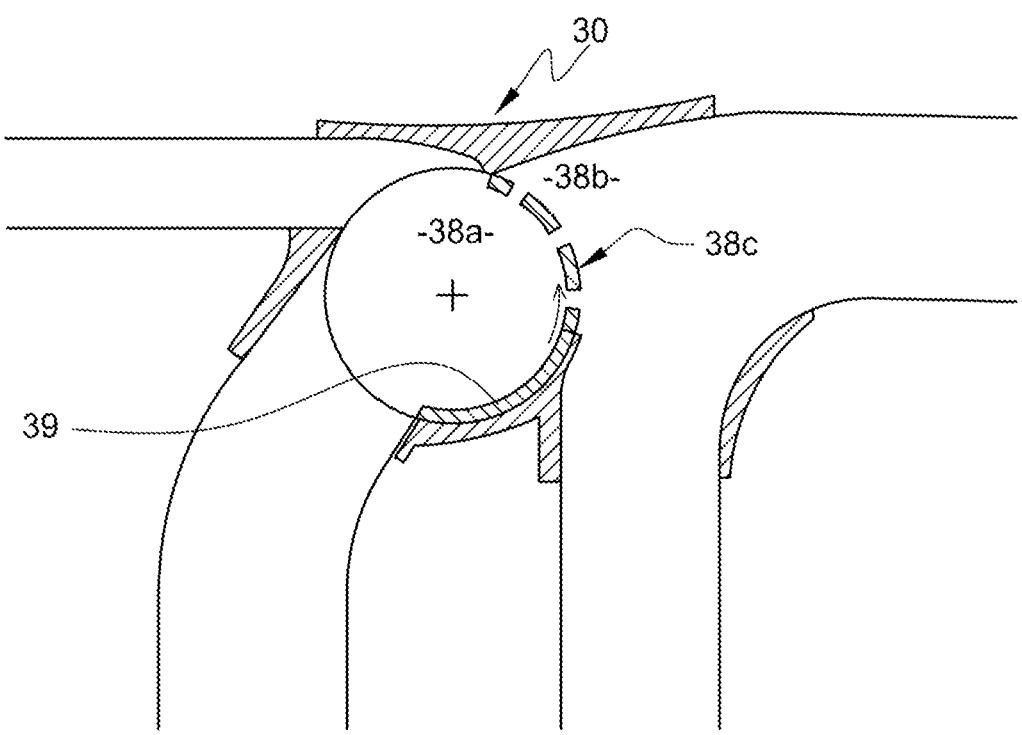
FIG. 5 is a cross-sectional view of the mixing unit of the internal combustion engine system shown in FIG. 2a in a second embodiment of the invention.

In reference to FIG. 5, it is illustrated an alternative embodiment of the four-way valve 30. In this embodiment, the first and second portions 38a, 38b of the internal chamber 38 are separated by a hemi-cylindrical central opening 38c. The closure element 39, that plays the same role as the flap of the embodiment of FIG. 3, comprises an hemi-cylindrical wall having substantially the same shape as the central opening 38c, said wall being rotatably movable in the internal chamber 38 between a first position, shown in dashed lines, in which it is angularly aligned with the central opening 38c to close it, and a second position, shown in solid lines, in which it is angularly offset from the central opening 38c to completely open it. The first position of the closure element 39 corresponds to the closed configuration of the valve 30 and the second position of the closure element 39 corresponds to the fully opened configuration of the valve 30. The closure element 39 may advantageously be disposed in an intermediate position (not shown) between said first and second positions, in which it is slightly angularly offset from the central opening 38c to partially open it. This intermediate position corresponds to a partially opened configuration of the valve 30.

It is to be understood that the present invention is not limited to the embodiments described above and illustrated in the drawings; rather, the skilled person will recognize that many changes and modifications may be made within the scope of the appended claims.

The invention claimed is:

1. Internal combustion engine system, comprising:
an internal combustion engine comprising a cylinder block housing a plurality of cylinders, a first intake manifold connected to a first group of cylinders, a second distinct intake manifold connected to a second group of cylinders and an exhaust manifold for receiving the exhaust gas emitted from at least the first group of cylinders;
an air inlet line;
an EGR line connected to the exhaust manifold;
wherein the internal combustion engine system is operable in at least two operating modes, respectively a normal operating mode in which all cylinders are supplied with fuel and a cylinder deactivation mode, in which the cylinders of the first group of cylinders are no longer supplied with fuel nor fresh air,
characterized in that:
the system also includes a mixing unit comprising a four-way valve, said four-way valve having a first inlet connected to the EGR line, a second inlet connected to the air inlet line, a first outlet connected to the first intake manifold and a second outlet connected to the second intake manifold;
the four-way valve is designed so that, in said normal operating mode, the intake gases supplied to the first intake manifold and to the second intake manifold have approximately the same proportion of exhaust gas and fresh air and so that, in said cylinder deactivation mode, the intake gas supplied to the first intake manifold only includes exhaust gas and the fresh air is directed exclusively to the second intake manifold.

2. The system according to claim 1, characterized in that the four-way valve is controlled so that, in said cylinder deactivation mode, the intake gas supplied to the second intake manifold includes only fresh air or a mixture of fresh air and exhaust gas.

3. The system according to claim 1, characterized in that the internal combustion engine system is operable in a partially deactivated mode in which the four-way valve is controlled so that the first intake manifold is partially supplied with fresh air and/or the second intake manifold is partially supplied with exhaust gas, thus leading to an increase of fresh air proportion in the first intake manifold and/or to an increase of exhaust gas proportion in the second intake manifold compared to the cylinder deactivation mode.

4. The system according to claim 1, characterized in that the four-way valve comprises a housing defining an internal chamber, the internal chamber having a first portion in fluid communication with the first inlet and the first outlet of the four-way valve and a second portion in fluid communication with the second inlet and the second outlet of the four-way valve, the first and second portions being separated by a central opening, the central opening being selectively closed by a closure element.

5. The system according to claim 4, characterized in that the closure element comprises a flap that is rotatably movable inside the internal chamber.

6. The system according to claim 5, characterized in that the flap has a bottom end and a top end, said flap being rotatably movable between a first position in which its bottom end, respectively its top end, abuts against a bottom abutment surface, respectively a top abutment surface, defined by the housing and in which it closes the central opening, a second position in which its bottom and top ends are far from the bottom and top abutment surfaces and in which it completely opens the central opening, and preferably an intermediate position between the first and second positions in which its bottom and top ends are close to said bottom and top abutment surfaces and in which it opens the central opening in a top part thereof that is close to the top abutment surface while closing said central opening in a bottom part thereof that is close to the bottom abutment surface.

7. The system according to claim 6, characterized in that, in the intermediate position of the flap, its bottom end is sealingly in contact with a bottom internal surface of the housing, thus preventing a flow of gas between the first and second portions of the internal chamber through the central opening in a bottom part thereof, and its top end is distant from a top internal surface of the housing, thus allowing a flow of gas between said first and second portions through the central opening in a top part thereof.

8. The system according to claim 4, characterized in that the closure element comprises a hemi-cylindrical wall having substantially the same shape as the central opening, said wall being rotatably movable inside the internal chamber.

9. The system according to claim 8, characterized in that the closure element is movable between a first position, in which it is angularly aligned with the central opening to close it, a second position, in which it is angularly offset from the central opening to completely open it, and preferably an intermediate position between the first and second positions in which it is slightly angularly offset from the central opening to partially open it.

10. The system according to claim 1, characterized in that it further comprises a controller for controlling the opening, the closing and/or the partial opening of the four-way valve.

11. The system according to claim 1, characterized in that an EGR valve is arranged downstream of the exhaust manifold on the path of exhaust gas flowing towards the EGR line, said EGR valve controlling the flow of exhaust gas through the EGR line.

12. The system according to claim 1, characterized in that the exhaust manifold also receives the exhaust gas emitted from the second group of cylinders.

13. The system according to claim 1, characterized in that the system includes a turbocharger comprising an air compressor and a turbine for driving said compressor, the turbine being arranged to be driven by exhaust gas flowing from the exhaust manifold to an exhaust after treatment system, the air compressor being arranged to supply compressed air to the air inlet line.

14. The system according to claim 1, characterized in that the system comprises a first exhaust manifold that receives the exhaust gas emitted from the first group of cylinders and a second exhaust manifold that receives the exhaust gas emitted from the second group of cylinders, in that an EGR valve is arranged downstream of the first exhaust manifold on the path of exhaust gas flowing towards the EGR line, said EGR valve controlling the flow of exhaust gas through the EGR line, and in that the system further includes a turbocharger comprising an air compressor and a turbine for driving said compressor, the turbine being arranged to be driven by exhaust gas flowing from the first and second exhaust manifolds to an exhaust after treatment system, the air compressor being arranged to supply compressed air to the air inlet line.

15. Vehicle comprising an internal combustion engine system according to claim 1.

* * * * *